United States Patent [19]

Gibson

[11] 4,361,095
[45] Nov. 30, 1982

[54] POWER SUPPLY FOR THE TRAVELING-FIELD WINDING OF A SYNCHRONOUS LINEAR MOTOR

[75] Inventor: John-Philip Gibson, Fürth-Vach, Fed. Rep. of Germany

[73] Assignee: Siemens Aktiengesellschaft, Munich, Fed. Rep. of Germany

[21] Appl. No.: 173,685

[22] Filed: Jul. 29, 1980

[30] Foreign Application Priority Data

Aug. 13, 1979 [DE] Fed. Rep. of Germany ....... 2932764

[51] Int. Cl.³ .............................................. H02P 7/46
[52] U.S. Cl. ..................................... 104/292; 318/38; 318/135
[58] Field of Search ............... 104/292, 290, 302, 303; 318/38, 135

[56] References Cited

U.S. PATENT DOCUMENTS

| 4,013,014 | 3/1977 | Holtz | ..................................... 104/292 |
| 4,068,152 | 1/1978 | Nakamura et al. | .................. 104/292 |
| 4,238,715 | 12/1980 | Parsch et al. | ....................... 104/292 |

*Primary Examiner*—Richard A. Bertsch
*Attorney, Agent, or Firm*—Kenyon & Kenyon

[57] ABSTRACT

An arrangement for distributing electrical power to one or more portions of a linear motor stator, the stator being of the type which is disposed along a track for propelling a track-bound vehicle. Current is supplied to the stator from a line conductor which is supplied at both ends by respective power supplies. In a further embodiment which is useful for distributing electrical power to long stators, double-throw switching elements are connected to the power supplies for permitting the power supply to provide current to a selectable one of two adjoining line conductors.

3 Claims, 2 Drawing Figures

POWER SUPPLY FOR THE TRAVELING-FIELD WINDING OF A SYNCHRONOUS LINEAR MOTOR

BACKGROUND OF THE INVENTION

This invention relates generally to linear electric motors, and more specifically to arrangements for supplying power to the traveling-field stator winding of a synchronous linear motor used in combination with track-bound vehicles.

Power delivery systems for linear motors having very long stators, such as those used in the operation of track-bound vehicles, have heretofore required high ampacity cable conductors for interconnecting closely-spaced converters for transforming electrical energy from a transmission system to a form suitable for use by the linear motor. The requirements of long lengths of high capacity cable and large numbers of power converters have resulted in major initial capital investment prior to the operation of a track-bound vehicle. There exists, therefore, a need for a system for distributing electrical energy to the stator of a long linear motor which will reduce the required initial capital investment, without degrading system performance.

SUMMARY OF THE INVENTION

The foregoing and other problems associated with the distribution of electrical energy to the stator of a long linear motor which is installed in a track of a track-bound vehicle are alleviated by this invention which subdivides the stator into a plurality of line sections, each such line section being connectable to a respective one of at least first and second converter pairs.

In one embodiment of the invention, each converter is connected to a three-phase transmission system. The three-phase outputs of the converters in the respective first and second pairs are connected to one another. Thus, the outputs of the first pair of converters are connected together, and the outputs of the second pair of converters are connected together. In one specific illustrative embodiment in which the stator is divided into first, second, third and fourth sequential sections, the first and third sections are connected by respective switching elements to the combined output of the first pair of converters. Similarly, the second and fourth stator sections are connected by respective switching elements to the combined output of the second pair of converters. This arrangement has the advantage that the conductors which interconnect the converters within each respective pair to one another and to the associated stator sections may have a current carrying capacity which is reduced to approximately one-half of the current carrying capacity required for such conductors in prior art arrangements which connect a section of the stator to only one converter. This results from the fact that the switching elements which connect a stator section to its associated pair of converters are in a closed position only when the track-bound vehicle is in the vicinity of the particular stator section. Thus, the converters within the associated pair will cooperate with one another so that each will produce approximately one-half of the total current required by the stator section. Moreover, the reduced current flowing through the conductors also reduces the voltage drops in the conductors by a proportionate amount, thereby permitting the converters to be spaced further apart from one another. Finally, the reduction in output current of each converter, as compared to prior art systems, permits lower power converters to be used. It becomes apparent, therefore, that the utilization of lower capacity conductors, and fewer converters of lower capacity will effect considerable savings in costs.

In a further embodiment of the invention, additional switching means are disposed between the converters and the stator sections, which permit each converter to be paired up with a selectable one of two other converters. Such advantageously selectable pairing permits each converter to service stator sections which are disposed bilaterally about the location of the additional switching means.

BRIEF DESCRIPTION OF THE DRAWINGS

Comprehension of the invention is facilitated by reading the following detailed description in conjunction with the annexed drawings, in which.

DETAILED DESCRIPTION

Figure 1:
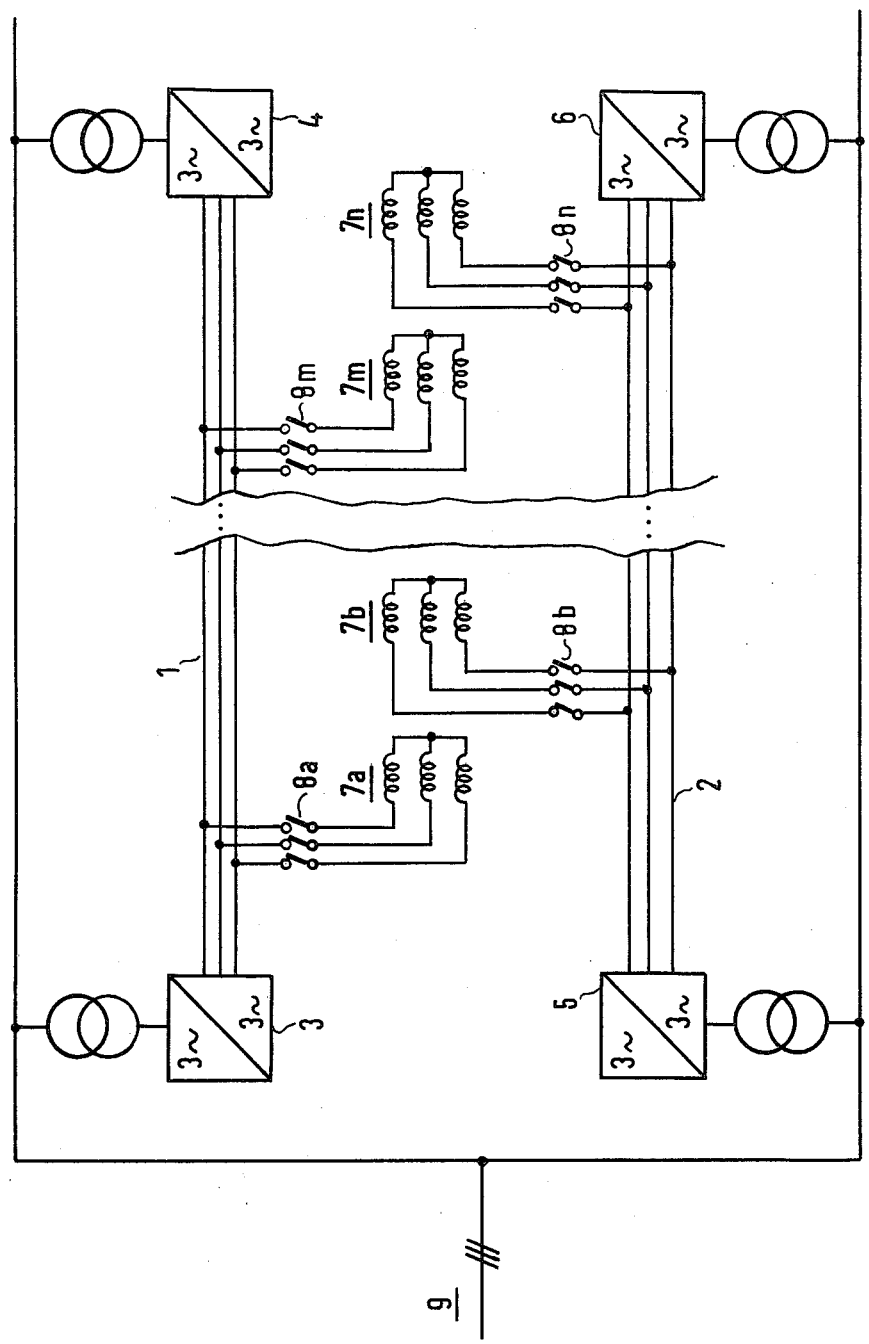
FIG. 1 illustrates one embodiment of the invention, partly in schematic form, and partly in block and line representation.

FIG. 1 shows a plurality of sections of a linear motor stator $7a$, $7b$, ... $7m$ and $7n$. Each such stator section contains three-phase windings which are connected to associated ones of supply conductors 1 and 2 by means of respectively associated three-phase switching elements $8a$, $8b$, ... $8m$ and $8n$. Sequential ones of stator sections $7a$ to $7n$ are alternatingly connected to supply conductors 1 and 2. Three-phase supply conductors 1 are connected at their ends to converters 3 and 4, so as to be supplied electrical energy from a pair of converters. Similarly, three-phase supply conductors 2 are connected at each end to a respective one of a pair of converters, consisting of converters 5 and 6. Each of converters 3, 4, 5 and 6 is connected to a three-phase transmission system 9. The converters are controlled in a manner similar to that described in U.S. Pat. No. 4,068,152, wherein electrical energy is conducted from transmission system 9 to the stator section at a predetermined voltage, frequency, and phase so as to produce a traveling wave that exerts a translatory force upon an exciter contained in the track-bound vehicle.

Selectable ones of switching elements $8a$ through $8n$ are closed when the track-bound vehicle is in the vicinity of the associated stator section. Illustratively, switching elements $8a$ are closed when the track-bound vehicle is in the vicinity of stator section $7a$. Stator section $7a$ receives electrical energy from converters 3 and 4. As the track-bound vehicle approaches the end of stator section $7a$, switching elements $8b$ are closed. Such closure permits conduction of electrical power to stator section $7b$ from converters 5 and 6, which are synchronized with converters 3 and 4 in voltage and phase so that the track-bound vehicle retains the desired velocity. After the vehicle has traversed and left stator section $7a$, switching elements $8a$ are opened so as to discontinue the flow of current to that stator section. Thus, except for a relatively short period of time, during which the track-bound vehicle crosses over from stator section $7a$ to $7b$, only one stator section is energized. This permits the delivery of electrical energy to the stator sections to be alternated between supply conductors 1 connected to converters 3 and 4, and supply conductors 2 connected to converters 5 and 6.

Since three-phase supply conductors 1 and 2 are each supplied electrical energy from both ends, each of the associated supply conductors in each of the three phases will carry approximately one-half of the current required for that particular phase by the energized stator section. Accordingly, each of the supply conductors may be of a smaller cross-section than would be required if each stator section were to be supplied by only one converter. Additionally, since such a reduction in current produces a corresponding reduction in the voltage drop and power dissipation within the conductors, the power rating of the converters can be reduced, and the distance between the converters increased. In this embodiment, if one of the converters fails, sufficient power is available to the stator section from the remaining operative converter to drive the track-bound vehicle at reduced speed. This permits emergency operation of the track-bound vehicle, even though one converter has failed.

Figure 2:
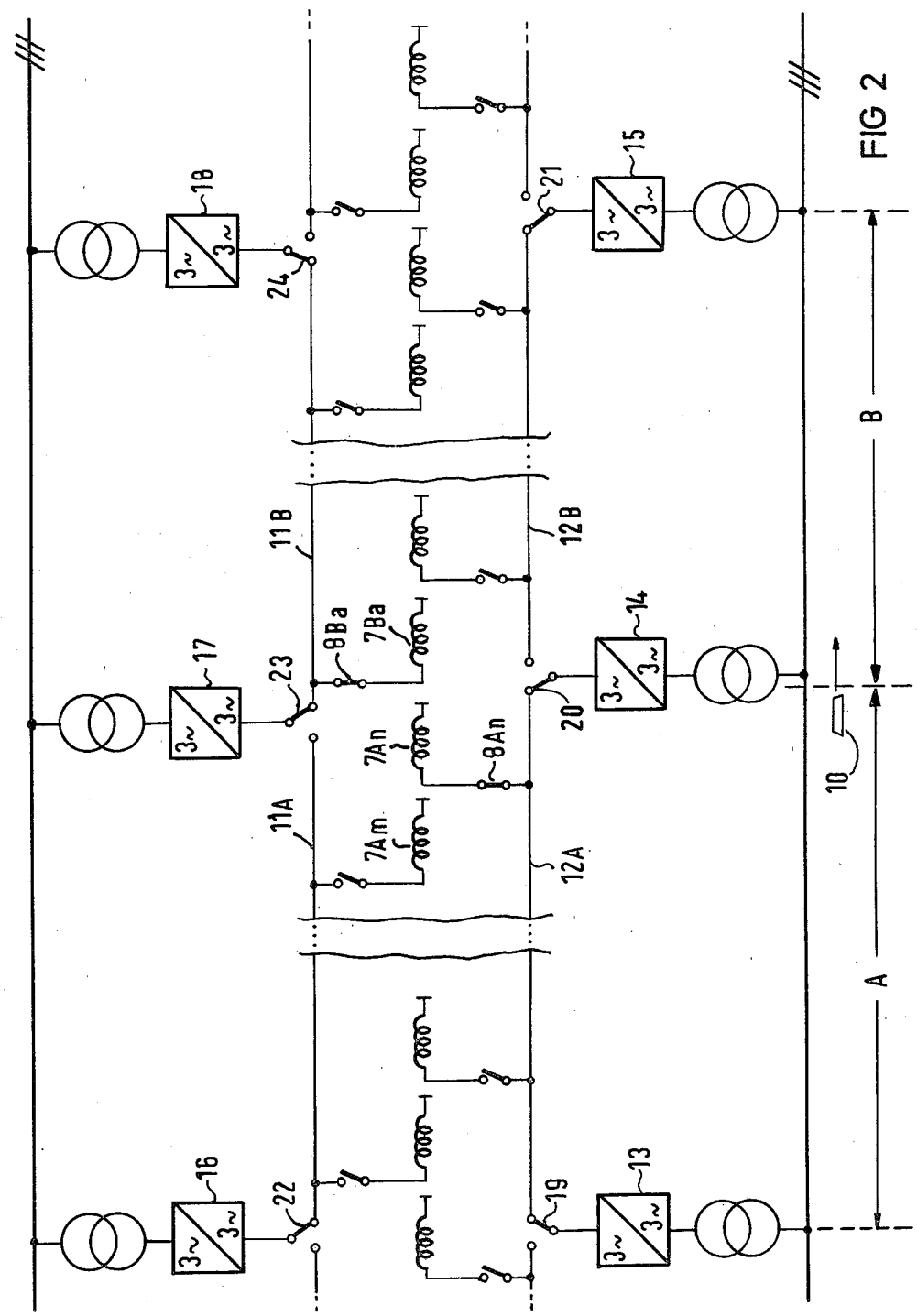
FIG. 2 depicts a further embodiment of the invention, partly in schematic form, and partly in block and line representation, which is useful for energizing very long linear motor stators.

FIG. 2 shows a portion of a stator which is longer than that shown in FIG. 1, the stator sections being energized by converters 13 through 18. For purposes of facilitating the description without unduly complicating the drawing, only one phase of a three-phase system is shown in FIG. 2. In this embodiment, each of the converters 13 through 18 has an associated double-throw switching element 19 through 24. As indicated, a double-throw switching element will be provided for each phase. Double-throw switching element 23 connects converter 17 selectably to either supply conductor 11A or 11B. Similarly, double-throw switching element 20 connects converter 14 to either line conductor 12A or 12B.

A track-bound vehicle 10 is shown traveling from left to right near the division between a section A and a section B. As long as track-bound vehicle 10 remains within section A, double-throw switching elements 19 and 20 connect respective converters 13 and 14 to line conductor 12A. Similarly, double-throw switching elements 22 and 23 would connect converters 16 and 17 so as to energize line conductor 11A. As vehicle 10 leaves the region of the next to last stator section 7A*m* of section A, double-throw switching element 23 switches to the position shown so as to energize line conductor 11B. As long as the vehicle is in the vicinity of the last stator section 7A*n* of section A, switching device 8A*n* remains closed so as to receive electrical energy from converters 13 and 14 by means of line conductor 12A. As vehicle 10 approaches the end of stator section 7A*n*, switching device 8B*a* is closed so as to energize stator section 7B*a* from converters 17 and 18 by means of line conductor 11B. Converters 17 and 18 are synchronized with converters 13 and 14 so that the transition from the last stator section 7A*n* of section A, to the first stator section 7B*a* of section B occurs without discontinuity. As soon as vehicle 10 has left the region of the last stator section 7A*n* of section A, switching device 8A*n* is opened and double-throw switching element 20 is switched so as to enable line conductor 12B from converters 14 and 15. This power supply arrangement and sequence of operation permits the stator sections to be energized without using a greater number of converters than would be used in known power supply systems of the type wherein each line conductor is supplied by only one converter.

The hereinabove described exemplary embodiment is illustrative of the application of the principles of the invention. It is to be understood that, in light of this teaching, numerous other arrangements may be devised by those skilled in the art without departing from the spirit and scope of the invention.

What is claimed is:

1. An arrangement for supplying electrical power to a first linear motor stator of the type used to propel a track-bound vehicle, the first linear motor stator being disposed along a track for producing a traveling-field which cooperates with an exciter disposed on the vehicle for propelling the vehicle along a first portion of the track, the first linear motor stator being connected by a first switching element to a first line conductor for receiving electrical current, characterized in that there are further provided first and second supply means connected at respective ends of the first line conductor, each such supply means providing a portion of an electrical current flowing through the first linear motor stator when the first switching element is in a closed state.

2. The arrangement of claim 1 wherein there are further provided:
   (a) a second linear motor stator disposed along the track for producing a traveling-field which cooperates with the exciter for propelling the vehicle along a second portion of the track,
   (b) a second switching element connected to said second linear motor stator,
   (c) a second line conductor connected to said second switching element for conducting electrical current to said linear motor stator,
   (d) third and fourth supply means connected at respective ends of said second line conductor, each such supply means providing a portion of an electric current flowing through said second linear motor stator when said second switching element is in a closed state, and
   (e) means for opening and closing said first and said second switching elements in response to the location of the vehicle along the track.

3. The arrangement of claim 2 wherein there are further provided
   at least a first double-throw switching element connected to one of said supply means for connecting said supply means to selectable ones of said line conductors, said selectable line conductors being associated with different respective portions of the track.

* * * * *